(12) United States Patent
Shankar P (10) Patent No.: US 8,028,296 B2
(45) Date of Patent: Sep. 27, 2011

(54) PROVIDING A WRAPPER AROUND NATIVE SYNCHRONIZATION OBJECTS

(75) Inventor: Shiva Shankar P, Chennai (IN)

(73) Assignee: Microsoft Corporation, Redmond, WA (US)

( * ) Notice: Subject to any disclaimer, the term of this patent is extended or adjusted under 35 U.S.C. 154(b) by 993 days.

(21) Appl. No.: 11/278,356

(22) Filed: Mar. 31, 2006

(65) Prior Publication Data

US 2007/0234368 A1 Oct. 4, 2007

(51) Int. Cl.
G06F 3/00 (2006.01)
G06F 7/00 (2006.01)
G06F 15/16 (2006.01)

(52) U.S. Cl. ......... 719/310; 707/610; 718/102; 709/248
(58) Field of Classification Search .................. 395/704; 718/106, 8; 714/3; 711/152
See application file for complete search history.

(56) References Cited

U.S. PATENT DOCUMENTS

| 6,009,269 | A | * | 12/1999 | Burrows et al. | 717/130 |
| 2002/0078123 | A1 | * | 6/2002 | Latour | 709/104 |
| 2004/0002974 | A1 | * | 1/2004 | Kravitz et al. | 707/8 |
| 2004/0078617 | A1 | * | 4/2004 | Moser et al. | 714/3 |
| 2004/0255087 | A1 | * | 12/2004 | Pudipeddi et al. | 711/152 |
| 2005/0080963 | A1 | * | 4/2005 | Schopp | 710/200 |
| 2006/0031844 | A1 | * | 2/2006 | Dice et al. | 718/106 |
| 2007/0067774 | A1 | * | 3/2007 | Kukanov et al. | 718/102 |

* cited by examiner

Primary Examiner — Andy Ho
Assistant Examiner — Tuan Dao
(74) Attorney, Agent, or Firm — Perkins Coie LLP (57) ABSTRACT

A facility for managing a synchronization mechanism that supports initialization, acquisition, release, and deletion operations is described. When a thread seeks to perform the acquisition operation, the facility permits performance of the acquisition operation only if the initialization operation has been performed more recently than the deletion operation. When a thread seeks to perform the deletion operation, the facility waits until any threads that are seeking to perform the acquisition operation or have performed the acquisition operation more recently than the release operation have performed the release operation before deleting the synchronization mechanism.

18 Claims, 6 Drawing Sheets

PROVIDING A WRAPPER AROUND NATIVE SYNCHRONIZATION OBJECTS

BACKGROUND

Synchronization mechanisms such as critical sections are used by software developers to coordinate the usage of resources by different threads of execution. For example, a software developer may use a synchronization mechanism to ensure that only one thread at a time manipulates the contents of a data structure, or that only one thread at a time executes a sensitive section of code.

It is typical for a synchronization mechanism to provide 4 functions:

| | |
|---|---|
| Initialize: | create the synchronization mechanism and prepare it for use |
| Acquire: | seek to own the synchronization mechanism in order to be able to interact with the associated resource; thread is blocked until Acquire succeeds |
| Release: | relinquish ownership of the synchronization mechanism |
| Delete: | delete the synchronization mechanism |

These functions often have different names in various operating systems. Function names can also vary between different types of synchronization mechanisms provided by the same operating system. Parameters of these functions can similarly vary.

In some cases, synchronization mechanisms are implemented in a way that creates unpredictable and/or undesirable results when these functions are called in certain orders. For example, in some versions of Microsoft Windows, one or more of the following combinations of function calls for a critical section synchronization mechanism can produce unpredictable and/or undesirable results: (1) calling the Acquire or Release function before the Initialize function is called; (2) calling the Acquire or Release function after the Delete function is called; and (3) calling the Delete function while one or more threads is blocked on the synchronization mechanism.

Because the simultaneous execution of multiple threads can create unexpected execution scenarios, it is sometimes difficult for software developers to generate code that uniformly avoids these combinations of function calls under all conditions.

BACKGROUND

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A software facility that establishes a wrapper around a native synchronization mechanism provided by an operating system and native functions called to interact with the native synchronization mechanism in order to preclude undesirable behavior of the native synchronization mechanism ("the facility") is described. As part of the wrapper, the facility provides an analog for each of the native synchronization object functions as follows:

safeInitialize: analog of Initialize
    safeAcquire: analog of Acquire
    safeRelease: analog of Release
    safeDelete: analog of Delete

DETAILED DESCRIPTION

A software facility that establishes a wrapper around a native synchronization mechanism provided by an operating system and native functions called to interact with the native synchronization mechanism in order to preclude undesirable behavior of the native synchronization mechanism ("the facility") is described. In some embodiments, the facility implements these analog functions as methods on a wrapper synchronization object. In some embodiments, in order to maintain the integrity of the wrapper functions when the analog functions are called in various combinations by different threads, the facility implements the analog functions using atomic variable access operations—such as InterlockedXXX operations provided by Microsoft Windows— that, once begun, are uninterruptible.

As part of the wrapper, the facility provides an analog for each of the native synchronization object functions as follows:

safeInitialize: analog of Initialize
    safeAcquire: analog of Acquire
    safeRelease: analog of Release
    safeDelete: analog of Delete In some embodiments, the facility implements safeInitialize and safeAcquire in such a manner that they fail if called before safeInitialize is called or after Delete is called.

In some embodiments, the facility implements safeDelete so that, rather calling Delete, it marks the synchronization mechanism for later deletion by safeRelease. SafeRelease deletes a synchronization mechanism marked for deletion only after a reference count maintained on the synchronization mechanism by the facility indicates that no threads currently own or are waiting to acquire the synchronization mechanism. In some embodiments, safeAcquire requires any threads that acquire the synchronization mechanism after it has been marked for deletion to immediately release the synchronization mechanism. In some embodiments, safeAcquire prevents threads from attempting to acquire the synchronization mechanism after it has been marked for deletion.

By providing a synchronization mechanism wrapper in some or all of the ways described above, the facility precludes potential undesirable behavior of the native synchronization object, making it easier to develop reliable software using the native synchronization mechanism through the wrapper than using the native synchronization mechanism directly.

Figure 1:
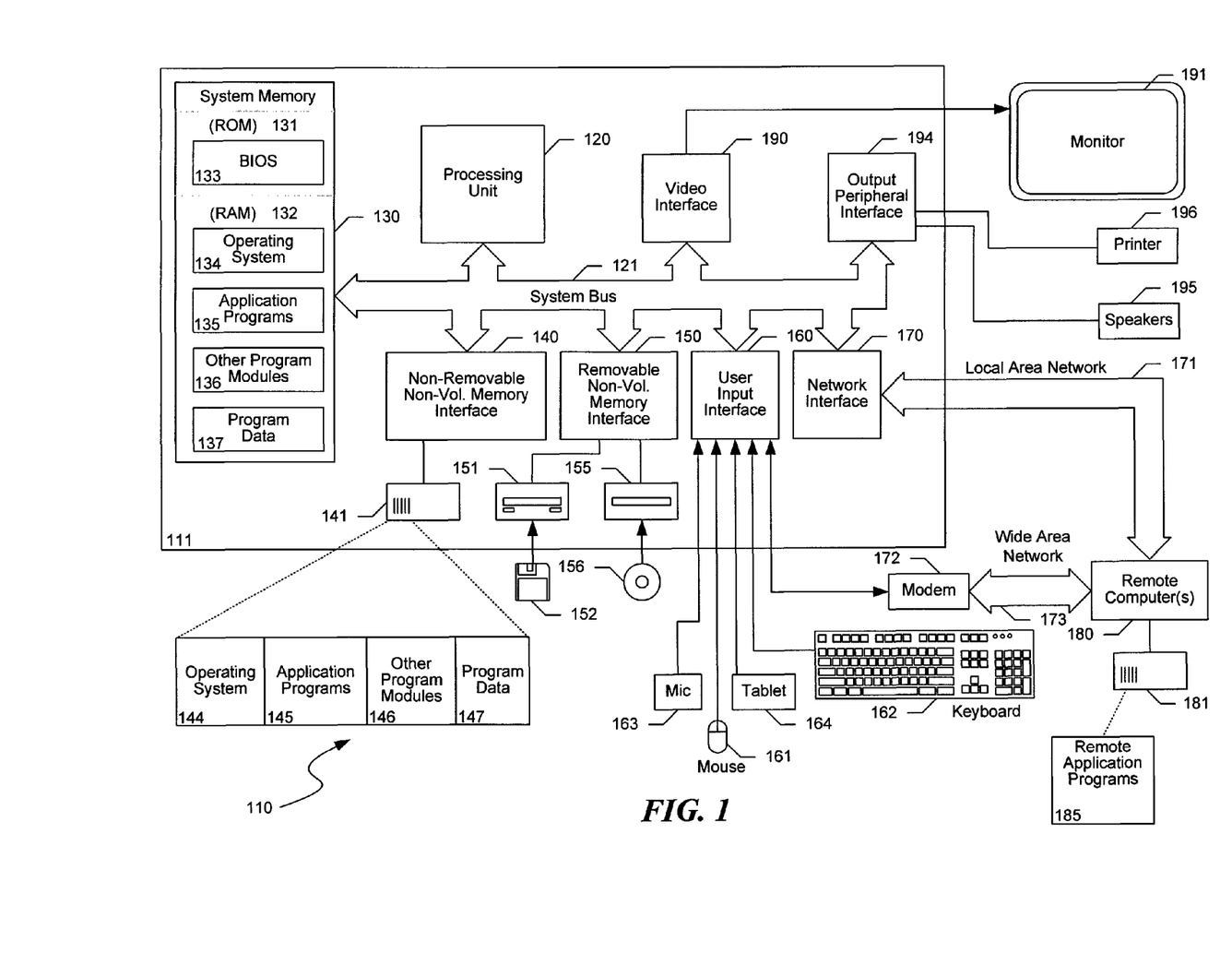
FIG. 1 illustrates an example of a suitable computing system environment or operating environment in which the techniques or facility may be implemented.

FIG. 1 illustrates an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 111 typically includes a variety of computer-readable media. Computer-readable media can be any available media that can be accessed by the computer 111 and includes both volatile and nonvolatile media and removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136 and program data 137.

The computer 111 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 111. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162 and pointing device 161, commonly referred to as a mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch screen panel can be physically coupled to a housing in which the computer 111 is incorporated, such as in a tablet-type personal computer. In addition, computing devices such as the computer 111 may also include other peripheral output devices such as speakers 195 and printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

Figure 2:
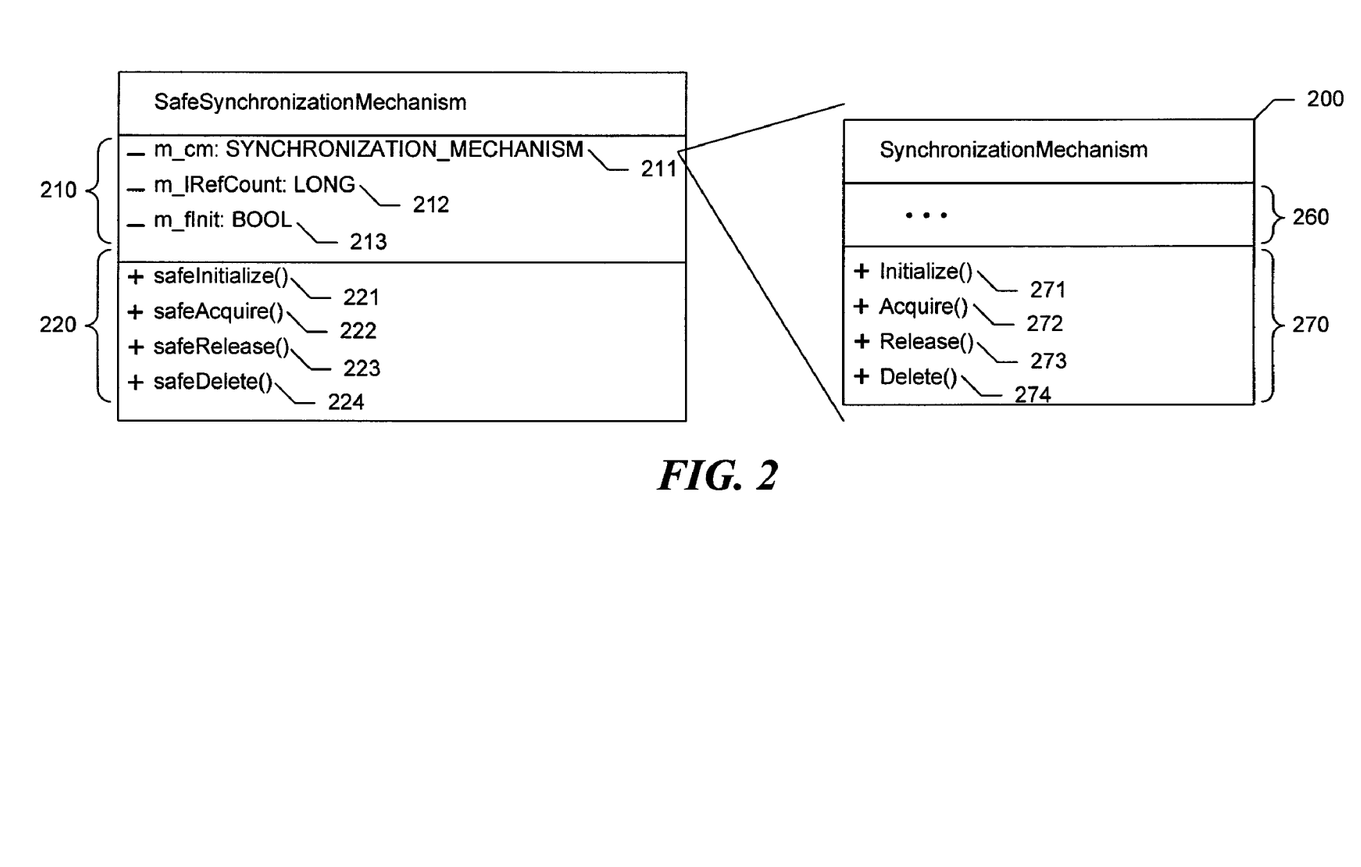
FIG. 2 is an object diagram showing the implementation of the wrapper as a SafeSynchronizationMechanism object in some embodiments.

FIG. 2 is an object diagram showing the implementation of the wrapper as a SafeSynchronizationMechanism object in some embodiments. A SynchronizationMechanism object 250 representing the native synchronization mechanism has data members 260 containing the native synchronization mechanism's state, as well as function members 270. The function members of the SynchronizationMechanism object include Initialize( ), Acquire( ), Release( ), and Delete( ).

An instance 211 of the SynchronizationMechanism object is among the data members of a SafeSynchronizationMechanism object 200. The data members 210 of the SafeSynchronizationMechanism object further include a reference count variable 212 and initialization state flag 213. The function members 220 of the SafeSynchronizationMechanism object include safeInitialize( ), safeAcquire( ), safeRelease( ), and safeDelete( ), which ultimately call the function members of the SynchronizationMechanism object.

Those skilled in the art will appreciate that, while the wrapper is shown here is being implemented as an object containing a native synchronization mechanism object, in various embodiments, the native synchronization mechanism, the wrapper, or both may be implemented using procedural programming or another programming scheme. Where the native synchronization mechanism or the wrapper is an object, those skilled and there will appreciate that it may be implemented having different contents and/or organization than shown.

Figure 3:
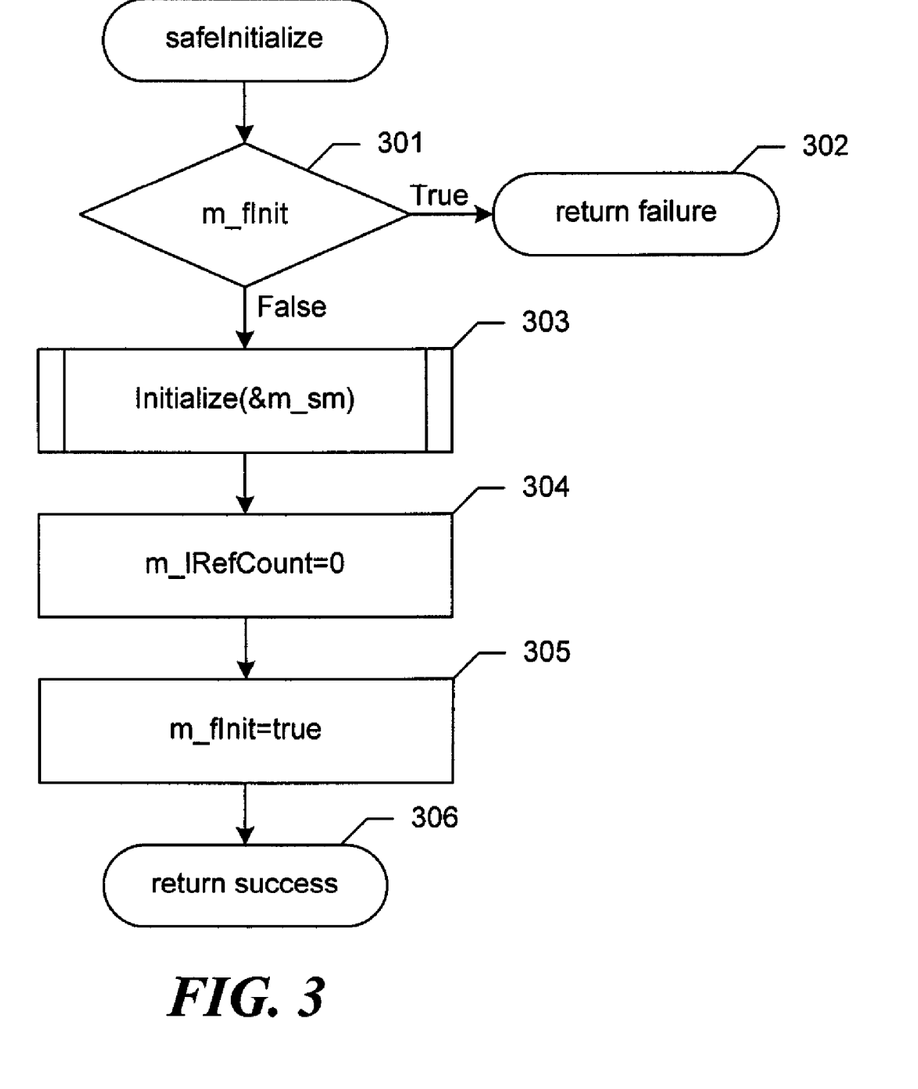
FIG. 3 is a flow diagram showing steps typically performed by the facility when the safeInitialize( ) function is called.

FIGS. 3-6 illustrate the four wrapper functions. FIG. 3 is a flow diagram showing steps typically performed by the facility when the safeInitialize( ) function is called. In step 301, if the initialization flag m_fInit is true, indicating that the synchronization mechanism is already initialized, then the facility continues in step 302 to return failure, else the facility continues in step 303. In step 303, the facility calls the Initialize( ) function to initialize the native synchronization mechanism, passing it the address of the native synchronization mechanism. In step 304, the facility sets reference count m_lRefCount equal to zero, indicating that no threads own or are waiting for the synchronization mechanism. In step 305, the facility sets initialization flag m_fInit to true, indicating that the synchronization mechanism has been initialized. In step 306, the facility returns success.

Figure 4:
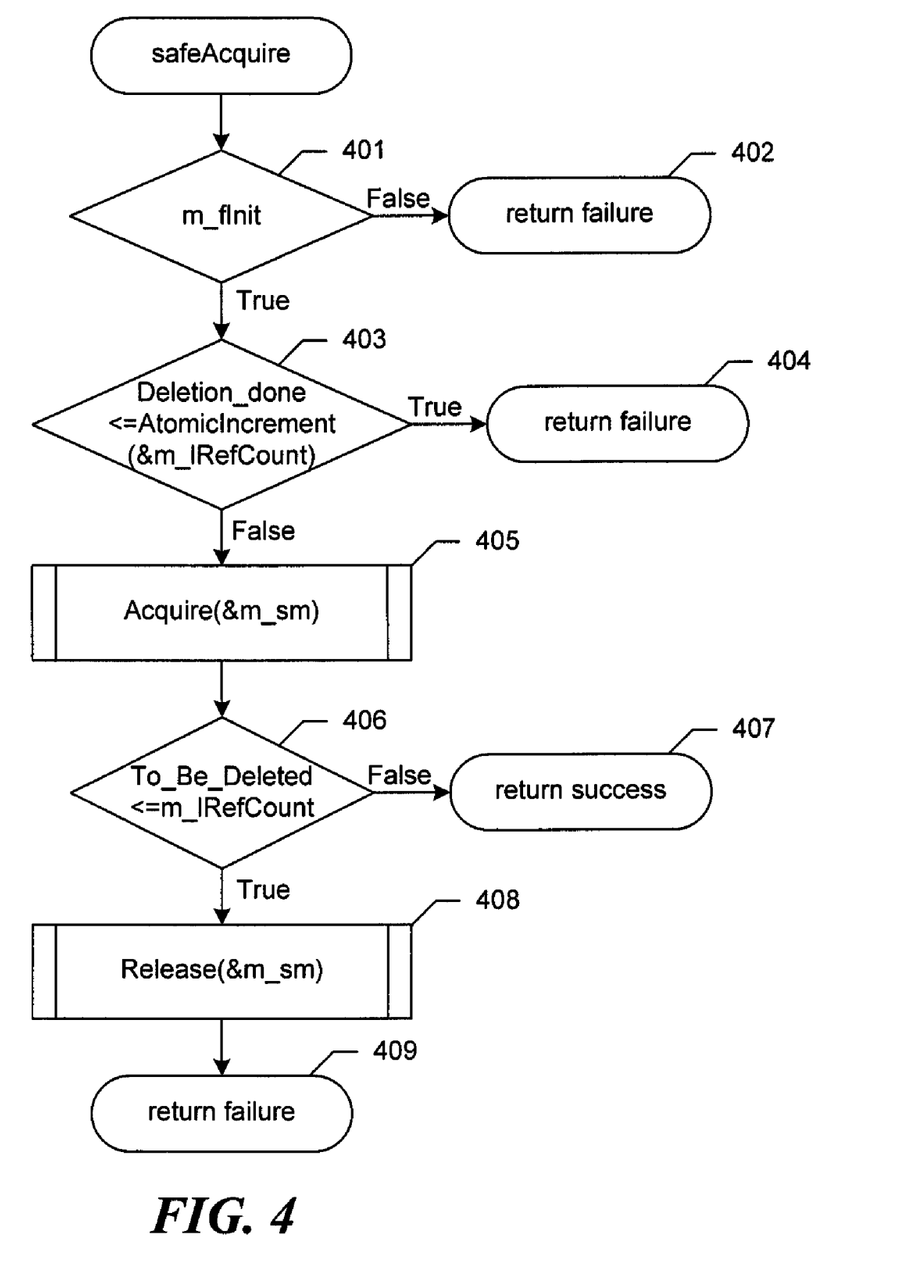
FIG. 4 is a flow diagram showing steps typically performed by the facility when the safeAcquire( ) function is called.

FIG. 4 is a flow diagram showing steps typically performed by the facility when the safeAcquire( ) function is called. In step 401, if the initialization flag is false, indicating that the synchronization mechanism isn't initialized, then the facility continues in step 402 to return failure, else the facility continues in step 403. In step 403, the facility calls an atomic increment function—such as the InterlockedIncrement( ) function provided by Microsoft Windows—to atomically increment the reference count to reflect the acquisition of the synchronization mechanism. If the result is greater than or equal to the DELETION_DONE constant, indicating that the synchronization mechanism has been marked by the safeRelease( ) function as deleted, then the facility continues in step 404 to return failure, else the facility continues in step 405. In step 405, the facility calls the Acquire( ) function to acquire the native synchronization mechanism, passing it the address of the native synchronization mechanism. In step 406, if the reference count is greater than or equal to the TO_BE_DELETED constant, indicating that the synchronization mechanism has been marked for deletion by the safeDelete( ) function, then the facility continues in step 408, else the facility continues in step 407 to return success. If the 408, the facility calls the Release( ) function to release the native transition mechanism, passing it the address of the native synchronization mechanism. In step 409, the facility returns failure.

Figure 5:
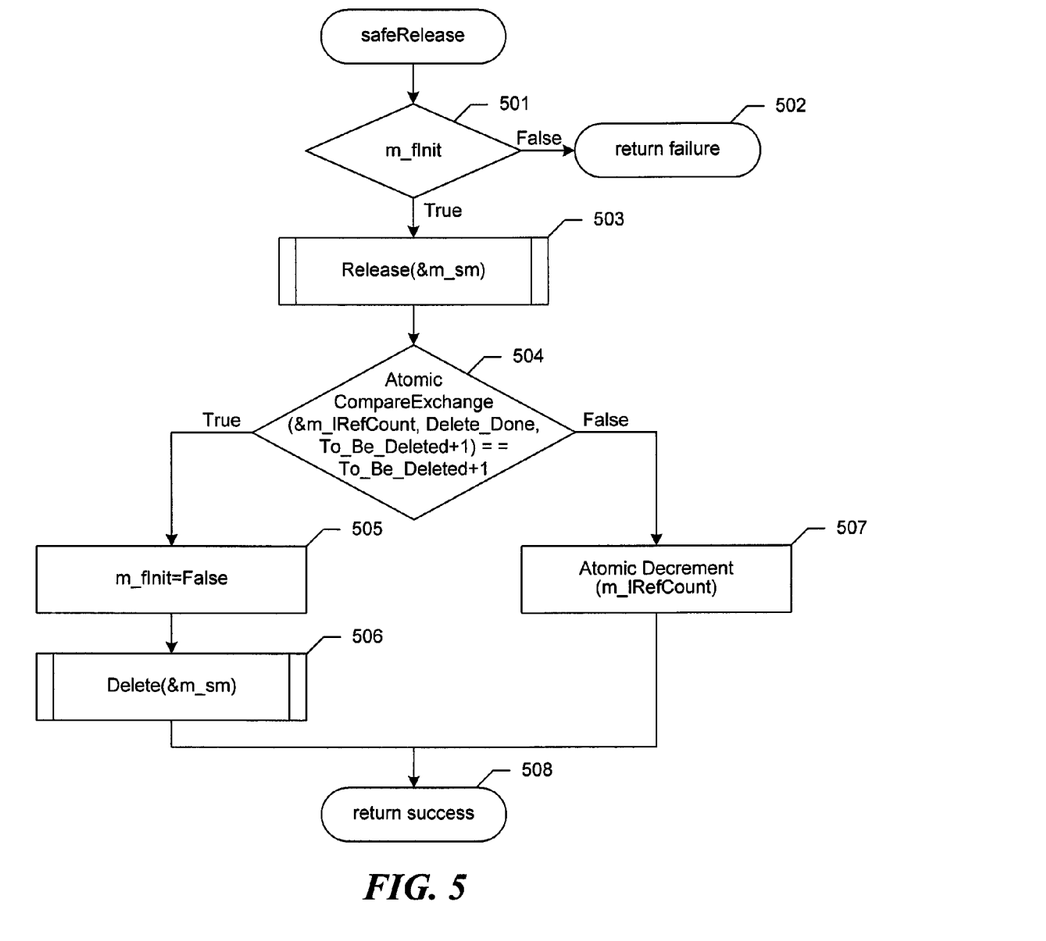
FIG. 5 is flow diagram showing steps typically performed by the facility when the safeRelease( ) function is called.

FIG. 5 is flow diagram showing steps typically performed by the facility when the safeRelease( ) function is called. In step 501, if the initialization flag is false, indicating that the synchronization mechanism isn't initialized, then the facility continues in step 502 to return failure, else the facility continues in step 503. In step 503, the facility calls the Release( ) function to release the native synchronization mechanism, passing it the address of the native synchronization mechanism. In step 504, the facility calls an atomic compare exchange function—such as the InterlockedCompareExchange( ) function provided by Microsoft Windows—to atomically store the value of the DELETE_DONE constant in the reference count if the reference count is equal to one more than the value of the TO_BE_DELETED constant—that is, if the synchronization mechanism has been marked for deletion by the safeDelete( ) function and the thread executing the safeRelease( ) function is the last thread owning or waiting for the synchronization mechanism. If this condition is satisfied, then the facility continues in step 505, else the facility continues in step 507. In step 505, the facility sets initialization flag to false, indicating that the synchronization mechanism is no longer initialized. In step 506, the facility calls the Delete ( ) function to delete the native synchronization mechanism, passing it the address of the native synchronization mechanism. After step 506, the facility continues in step 508 to return success. In step 507, the facility calls an atomic decrement function—such as the InterlockedDecrement( ) function provided by Microsoft Windows—to atomically decrement the reference count to reflect the release of the synchronization mechanism. After step 507, the facility continues in step 508 to return success.

Figure 6:
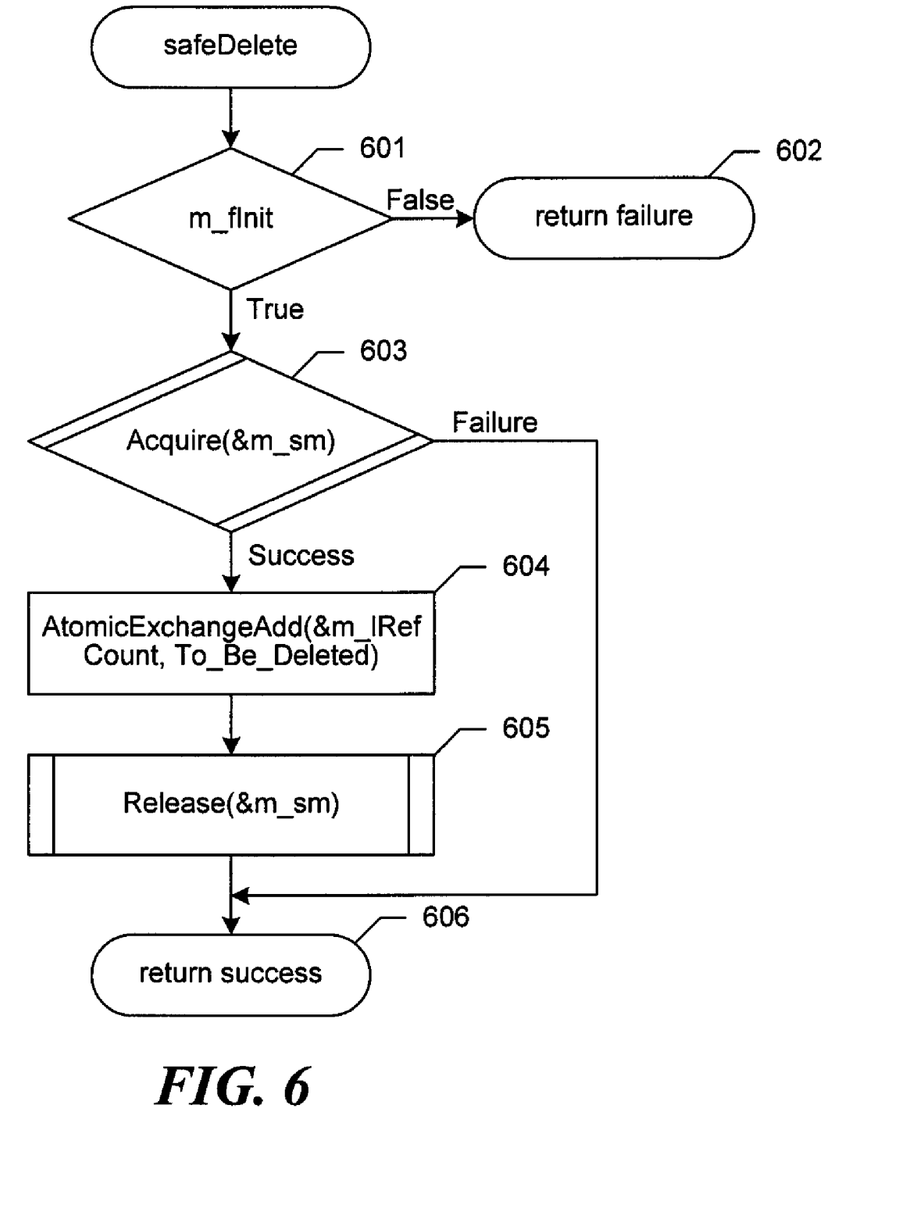
FIG. 6 is a flow diagram showing steps typically performed by the facility when the safeDelete( ) function is called.

FIG. 6 is a flow diagram showing steps typically performed by the facility when the safeDelete( ) function is called. In step 601, if the initialization flag is false, indicating that the synchronization mechanism isn't initialized, then the facility continues in step 602 to return failure, else the facility continues in step 603. In step 603-605, the facility acquires the synchronization mechanism to be sure that the current thread owns the synchronization mechanism when it marks the synchronization mechanism for deletion, then releases the synchronization mechanism to undo its acquisition. In step 603, the facility calls the Acquire( ) function to acquire the native synchronization mechanism, passing it the address of the native synchronization mechanism. If this function call returns success, then the facility continues in step 604, else the facility continues in step 606. In step 604, the facility calls an atomic exchange add function—such as the InterlockedExchangeAdd( ) function provided by Microsoft Windows—to atomically add the value of the TO_BE_DELETED constant to the reference count, indicating that the synchronization mechanism is to be deleted. In step 605, the facility calls the Release( ) function to release the native synchronization mechanism, passing at the address of the native synchronization mechanism. In step 606, the facility returns success.

Tables 1 and 2 below contain pseudocode that can be used to implement some embodiments of the facility, such as embodiments directed to wrapping a critical section object provided by the Microsoft Windows operating system. Table 1 is a structure declaration for a SafeCS wrapper object.

TABLE 1

| 1 | // provides enhanced functionality to the normal CRITICAL_SECTION object |
|---|---|
| 2 | struct SafeCS |
| 3 | { |
| 4 | CRITICAL_SECTION m_cs; //the actual critical section object |

TABLE 1-continued

| 5 | LONG m_IRefCount; //to keep track of the number of threads waiting for/already holding the CS object |
|---|---|
| 6 | BOOL m_fInit; //to check for initialization consistency |
| 7 | // This function is used to safely initialize the critical section object. |
| 8 | // Ensure that the SafeCS object is zero filled before calling initialize (to ensure that m_fInit is FALSE) |
| 9 | BOOL Initialize( ); |
| 10 | // to enter the critical section, returns TRUE is successful, FALSE is failed |
| 11 | // this function will fail, if... |
| 12 | //  1. if we try to enter un-initialized object |
| 13 | //  2. if we try to enter an object that has been deleted (un-initialized) |
| 14 | //  3. if we are waiting for entering this object while someone else has deleted the object |
| 15 | BOOL Enter( ); |
| 16 | // to leave the acquired critical section |
| 17 | // caller has to ensure that he calls this fn. only if he had successfully acquired the critical section using Enter( ) |
| 18 | BOOL Leave( ); |
| 19 | // used to safely delete the critical section object |
| 20 | // after this object has been deleted everyone waiting for this object will return with a failure |
| 21 | // this function internally enters the critical section object, callers have to ensure that this behavior doesn't cause deadlock |
| 22 | BOOL Delete( ); |
| 23 | }; |

The SafeCS wrapper object contains the following data members: m_CS, a native critical section object; m_IRefCount, a counter of the number of threads that are waiting for or already holding the native critical section object, with adjustments to reflect to-be-deleted and deletion-done status; and m_fInit, to indicate whether the safe critical section object has been initialized more recently than it has been deleted. The SafeCS object has the following function members: Initialize, Enter, Leave, and Delete.

Table 2 below shows pseudocode containing implementations for the Initialize, Enter, Leave, and Delete methods of the SafeCS object.

m_IRefCount is used throughout the SafeCS object's function members. This variable is used to keep track of the total number of threads which are either waiting to enter the critical section or has entered the critical section.

This reference count is a counter in the normal sense when the object is initialized and being used.

When the object is marked for deletion, this reference count will be greater than or equal to the value of TO_BE_DELETED. The reference count minus TO_BE_DELETED will give the number of threads which are either waiting to enter the critical section object or has entered the critical section object.

When the critical section object is actually deleted, the reference count will be made equal to DELETION_DONE, and any other thread which tries to enter the object after this will find the reference count value to be greater than this and will return failing the call.

TABLE 2

| 1 | #include "pch.h" |
|---|---|
| 2 | #include "SafeCS.h" |
| 3 | #define TO_BE_DELETED      (0x20000000) |
| 4 | //added to the reference count variable to indicate the object is to be deleted |
| 5 | #define DELETION_DONE      (0x40000000) |
| 6 | //added to reference count var. to indicate that the object has been deleted and can't be used further |
| 7 | /*************************************************************************** |
| 8 | ** Function Name: SafeCS.Initialize( ) |
| 9 | ** Comments: simple fn. to initialize the object, ensure that the object is zero filled before calling this fn. |

TABLE 2-continued

```
10   ************************************************************************/
11   BOOL    SafeCS::Initialize( )
12   {
13       //Step #1: ensure that this is not already initialized
14       if ( TRUE == m_fInit )
15           return FALSE;
16
17       //Step #2: do the required setting up
18       InitializeCriticalSection ( &m_cs );
19       m_lRefCount = 0;
20       m_fInit = TRUE;
21       //Step #3: things were successful
22       return TRUE;
23   }
24   /**********************************************************************
25   ** Function Name: SafeCS.Enter( )
26   ** Comments: to enter the critical section, will fail if the object is deleted (or marked for
             deletion)
27   ************************************************************************/
28   BOOL    SafeCS::Enter( )
29   {
30       //Step #1: valid only if this object has been initialized already (and not yet deleted)
31       if ( FALSE == m_fInit )
32           return FALSE;
33       //Step #2:   to ensure that the object is not yet deleted
34       //           deleted objects will have this flag set on the reference count variable
35       //           we do the increment simultaneously to have the operation as atomic
36       if ( DELETION_DONE <= InterlockedIncrement ( &m_lRefCount ) )
37           return FALSE;
38       //Step #3:   now we can safely enter the critical section as it is not yet deleted
39       //           even if some other thread marks the object for deletion we don't mind
40       //           as we have incremented the reference count, we can safely wait to enter
41       EnterCriticalSection ( &m_cs );
42       //Step #4:   but if it is marked for deletion, we have to leave and return failure
43       //           while waiting, if some other guy has marked this object for deletion
44       //           we must leave this object asap and return a failure
45       if ( TO_BE_DELETED <= m_lRefCount )
46       {
47           Leave( );
48           return FALSE;
49       }
50       //Step #5: return success, as we've successfully acquired the critical section object
51       return TRUE;
52   }
53   /**********************************************************************
54   ** Function Name: SafeCS.Leave( )
55   ** Comments: to leave an acquired critical section, assumes that the call will be legitimate
             (i.e., leave only if successfully entered)
56   ************************************************************************/
57   BOOL    SafeCS::Leave( )
58   {
59       //Step #1: valid only if this object has been initialized already
60       if ( FALSE == m_fInit )
61           return FALSE;
62       //Step #2: leave the critical section first
63       LeaveCriticalSection ( &m_cs );
64       //Step #3:   check if we are the last person holding this critical section and delete if
             needed
65       //           refer to MSDN to see how 'InterlockedCompareExchange' works
66       //           we are the last person if reference count equals 1 or (TO_BE_DELETED+1)
67       //           if the reference count is (TO_BE_DELETED+1), it means that we need to delete
             the object after this
68       //           else if the reference count is 'x' or (TO_BE_DELETED+'x') where 'x'>1, a simple
             decrement is enough
69       //               if the critical section is deleted, we also update the reference count to
             indicate DELETION_DONE
70       if  (  TO_BE_DELETED+1 == InterlockedCompareExchange ( &m_lRefCount, DELETION_DONE,
             TO_BE_DELETED+1 ) )
71       {
72           m_fInit = FALSE;
73           DeleteCriticalSection ( &m_cs );
74       }
75       else
76           InterlockedDecrement ( &m_lRefCount );
77   //the object is not yet deleted, a simple reference count decrement is enough
78       //Step #4: we simply return a success
79       return TRUE;
80   }
81   /**********************************************************************
82   ** Function Name: SafeCS.Delete( )
```

TABLE 2-continued

```
83      ** Comments: used to mark that a critical section object is to be deleted and no one should be
           given access to it
84      ********************************************************************************/
85      BOOL    SafeCS::Delete( )
86      {
87          //Step #1: valid only if this object has been initialized already
88          if ( FALSE == m__fInit )
89              return FALSE;
90          //Step #2:    enter the critical section, this is to ensure that a CS is not marked for
               deletion when someone else is holding it
91          //               however, if the same thread is holding this critical section, it is not a
               problem
92          if ( TRUE == Enter( ) )
93          {
94              //Step #3:   add TO__BE__DELETED to the reference count to indicate that it is to be
                   deleted
95              InterlockedExchangeAdd ( &m__lRefCount, TO__BE__DELETED );
96              //Step #4:      done the job, hereafter, anyone waiting to enter on the critical section
                   will return with FALSE
97              //             leave the critical section now
98              Leave( );
99          }
100         //Step #5: we simply return a success
101         return TRUE;
102     }
```

The facility addresses the problem of calling safeAcquire or safeRelease before safeInitialize by maintaining and testing the m_fInit variable, which indicates whether the SafeSynchronization mechanism is currently initialized or uninitialized safeAcquire and safeRelease both test this variable, and return failure if it is false.

The facility addresses the problem of a thread calling the safeAcquire or safeRelease function after the synchronization mechanism object has been deleted by calling safeDelete in the same manner as described immediately above.

The facility addresses the problem of a thread calling safeDelete while the synchronization mechanism is owned or being waited on by one or more other threads by ensuring that a thread which tries to delete the SafeSynchronizationMechanism object has to first acquire the synchronization mechanism (after ensuring that it is initialized first of all using safeInitialize( )). Once the synchronization mechanism is acquired in safeDelete( ), it is marked as unusable by other threads which might be waiting for it. (The TO_BE_DELETED flag is used for this.)

By acquiring the synchronization mechanism in safeDelete( ), the facility ensures that no other thread is holding onto it. Further, since the synchronization mechanism is not immediately deleted, but rather marked as unusable, other threads that are waiting for it still have the proper synchronization mechanism object to work upon.

If any thread waiting in safeAcquire( ) acquires the synchronization mechanism after it has been marked as unusable, it will release it immediately and the safeAcquire( ) call would fail (returning FALSE).

When the last thread waiting in Acquire( ) to acquire the synchronization mechanism while the synchronization mechanism is marked as unusable returns from Acquire( ), safeAcquire( ) marks the object as deleted, delete the synchronization mechanism, and fails the call (returning FALSE).

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

It will be appreciated by those skilled in the art that the above-described facility may be straightforwardly adapted or extended in various ways. For example, the facility may be used to interact with various types of synchronization mechanisms, implemented by various operating systems or other software systems. The facility may be implemented using various programming schemes, including but not limited to object-oriented programming and procedural programming. While the foregoing description makes reference to particular embodiments, the scope of the invention is defined solely by the claims that follow and the elements recited therein.

I claim:

1. A computer-readable storage medium whose contents implement in a computing system functions for accessing a synchronization mechanism, the functions comprising:
   a safe initialization function called by a thread to initialize the synchronization mechanism so that the synchronization mechanism can be used by any thread;
   a safe acquisition function called by a thread to acquire the synchronization mechanism, in some cases after waiting for release of the synchronization mechanism by a thread that previously acquired the synchronization mechanism;
   a safe release function called by a thread to release the synchronization mechanism after acquiring the synchronization mechanism; and
   a safe deletion function called by a thread to delete the synchronization mechanism so that the synchronization mechanism can no longer be used by any thread,
   the safe acquisition function permitting calling threads to acquire or wait to acquire the synchronization mechanism only if the safe initialization function has been called more recently than the safe deletion function,
   the safe deletion function deferring deletion of the synchronization mechanism until any threads that previously acquired the synchronization mechanism release it and until any threads waiting for the synchronization mechanism resume execution.

2. The computer-readable storage medium of claim 1 wherein the safe initialization mechanism sets a flag—which the safe deletion function clears—that is tested by the safe acquisition function in order to determine whether to permit calling threads to acquire or wait to acquire the synchronization mechanism.

3. The computer-readable storage medium of claim 1 wherein the safe deletion function:
   requires a calling thread to acquire the synchronization mechanism;
   after the calling thread has acquired the synchronization mechanism:
      marks the synchronization mechanism for deletion; and
      releases the synchronization mechanism on behalf of the calling thread.

4. The computer-readable storage medium of claim 3 wherein the safe acquisition function, for each calling thread that is permitted to acquire the synchronization mechanism after the synchronization mechanism is marked for deletion, requires the calling thread to immediately release the synchronization mechanism.

5. The computer-readable storage medium of claim 4 wherein the safe release function deletes the synchronization mechanism when (1) the synchronization mechanism is marked for deletion and (2) the calling thread is the last thread that has acquired or is waiting for the synchronization mechanism.

6. The computer-readable storage medium of claim 1 wherein the functions are provided as a wrapper around native functions implemented for accessing the synchronization mechanism.

7. A method in a computing system having a processor for managing a synchronization mechanism that supports a safe initialization function called by a thread to initialize the synchronization mechanism so that the synchronization mechanism can be used by any thread, a safe acquisition function called by a thread to acquire the synchronization mechanism—in some cases after waiting for release of the synchronization mechanism by a thread that previously acquired the synchronization mechanism, a safe release function called by a thread to release the synchronization mechanism after acquiring the synchronization mechanism, and a safe deletion function called by a thread to delete the synchronization mechanism so that the synchronization mechanism can no longer be used by any thread operations, comprising:
   with the processor, when a thread calls the acquisition function, permitting the calling thread to acquire the synchronization mechanism only if the safe initialization function has been called more recently than the safe deletion function; and
   with the processor, when a thread calls the deletion function, waiting until any threads that previously acquired the synchronization mechanism release it and until any threads waiting for the synchronization mechanism resume execution before deleting the synchronization mechanism so that the synchronization mechanism can no longer be used by any thread.

8. The method of claim 7, further comprising, when a thread seeks to perform the deletion operation, forcing any threads that are seeking to perform the release operation immediately after they are permitted to perform the acquisition operation.

9. The method of claim 7 wherein an operating system is executing on the computing system, and wherein the initialization, acquisition, release, and deletion operations of the synchronization mechanism are provided by a synchronization mechanism API of the operating system, and wherein the method is performed by a wrapper around the synchronization mechanism API of the operating system.

10. The method of claim 9 wherein the wrapper maintains one or more indications of (1) the number of threads that are seeking to perform the acquisition operation or have performed the acquisition operation more recently than the release operation, and (2) whether a thread is seeking to perform the deletion operation using atomic variable access operations.

11. The method of claim 10 wherein the wrapper maintains the indications using InterlockedXXX operations provided by the operating system.

12. The method of claim 9 wherein the wrapper is implemented as a safe synchronization mechanism object class.

13. The method of claim 9 wherein the wrapper is implemented in the operating system.

14. A multithreaded computing system, comprising:
   a processor;
   an operating system executing on the processor;
   a resource usable by one or more threads;
   a native synchronization mechanism implemented by the operating system for synchronizing access to the resource; and
   a synchronization mechanism wrapper through which threads access the native synchronization mechanism,
   wherein the native synchronization mechanism provides an initialization operation by which a thread can initialize the native synchronization mechanism for use by any thread, an acquisition operation by which a thread can acquire the native synchronization mechanism, a release operation by which a thread can release the synchronization mechanism after requiring synchronization mechanism, and a deletion operation by which a thread can disable the native synchronization mechanism from use by any thread,
   and wherein the synchronization mechanism wrapper prevents any thread from performing the acquisition operation unless the initialization operation has been performed more recently than the deletion operation,
   and wherein the synchronization mechanism wrapper prevents any thread from performing the deletion operation until any threads that previously performed the acquisition operation perform the release operation and until any threads waiting for the synchronization mechanism resume execution.

15. The computing system of claim 14 wherein the native synchronization mechanism is a critical section.

16. The computing system of claim 14 wherein the native synchronization mechanism is a mutex.

17. The computing system of claim 14 wherein the native synchronization mechanism is a semaphore.

18. The computing system of claim 14, wherein the acquisition operation provided by the native synchronization mechanism may cause a thread to block that performs the acquisition operation while the native synchronization mechanism is owned by another thread,
   and wherein the synchronization mechanism wrapper prevents any thread from performing the deletion operation while any thread performing the acquisition operation is blocked.

* * * * *